(12) United States Patent
Ishihara

(10) Patent No.: US 6,580,404 B1
(45) Date of Patent: Jun. 17, 2003

(54) DOT MATRIX DISPLAY

(75) Inventor: Takayuki Ishihara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/251,423

(22) Filed: Feb. 17, 1999

(30) Foreign Application Priority Data

Feb. 20, 1998 (JP) .......................................... 10-038597

(51) Int. Cl.[7] ................................................. G09G 5/00
(52) U.S. Cl. ......................... 345/1.3; 359/127; 345/2.3
(58) Field of Search ............................. 345/1, 3, 2, 55, 345/207, 82, 2.3, 1.3, 1.1; 359/109, 127, 154; 370/419

(56) References Cited

U.S. PATENT DOCUMENTS 4,833,542 A  *  5/1989  Hara et al.
5,663,739 A  *  9/1997  Pommerenke et al. ......... 345/1
5,995,512 A  * 11/1999  Pogue, Jr. .................... 370/419

* cited by examiner

*Primary Examiner*—Kent Chang
(74) *Attorney, Agent, or Firm*—Arent Fox Kintner Plotkin & Kahn, PLLC

(57) ABSTRACT

The invention has its object to provide a highly reliable dot matrix display which is free from the trouble of work of connecting the leads comprising the wire harness and the like between the dot matrix modules to be displayed in parallel arrangements, and which does not show disconnection even in case of occurrence of vibration. The dot matrix display comprises a plurality of parallel arrangements of the dot matrix modules which have a luminous section provided in matrix form, and a drive section for controlling the display contents in the module. And, there are provided on the respective module a light emitting element and a light receiving element which can send and receive the display signal between the adjacent modules in case of the transmission of the display signal based on each module from the end part of the modules in parallel arrangement.

1 Claim, 2 Drawing Sheets

DOT MATRIX DISPLAY

FIELD OF THE INVENTION

The present invention relates to a dot matrix display comprising a semiconductor light emitting element array or a liquid crystal display whose pixels (picture elements) are arrayed in matrix form for displaying the desired characters, numerals, graphics, and the like. More particularly, the invention relates to a dot matrix display in which the data transfer between the modules is simplified in the case of constituting a large display by arraying the dot matrix modules having matrix pixels (picture elements), in vertical and/or horizontal direction.

BACKGROUND OF THE INVENTION

For example, in displaying a starting/arriving time guide in railway station by using a semiconductor light emitting diode (hereinafter to be referred to as LED), display is required to be made in large characters as large display size so as to allow the visitors to view the contents from a distant location. For this purpose, for example, the dot matrix modules formed by arraying for example LED in matrix form of 16×16 or 24×24, are arrayed in a lateral direction and/or vertical direction, and are used to make display of one Japanese character by each module, and thus a display of for example "FIRST START, SPECIAL EXPRESS, TIME 00:00, LINE 1" is made by the whole modules.

In such a dot matrix display, for example, if the data to be displayed are inputted in the respective ones of the modules arrayed in a lateral direction, very large number of wiring lines are to be employed. Therefore, there is adopted a system to send in the display data as serial data from the module at the end and transfer the data to each adjacent module. Because of this, for example, as the reverse side of a part of the module 20 is shown in FIG. 5, the modules 20 are connected with means called wire harness 26 which is made by bundling wires in a plate form with nylon or the like, to make it possible to transfer the data.

In FIG. 5, the numeral 20 shows a dot matrix module, and 21 shows a lamp type LED constituting each dot (pixel), being fixed to the LED substrate 23 at its package part, with the lead connected to the display section substrate 24 through the through-hole and fixed. A part of the lead of LED 21 is further connected to the control substrate 22 through the through-hole of the control substrate 22 and fixed. On the reverse side of the control substrate 22 (upper part in the drawing), though not illustrated, there are wiring for driving each module, IC such as RAM for temporarily recording the data to be displayed, and shift register are provided and connected with the connectors 25. And, in order to input the data to be displayed in the IC of each module 20 or to make control for changing over the display, connection is made between the modules 20 by the wire harness 26 made by bundling wires, so that, as described above, the data are to be successively transmitted from the end module 20. The data to be transmitted between the modules 20 include the serial data for display, clock signal, address signal, functional signal, etc., and the number of wires is about 10.

In the conventional dot matrix display, as described above, the modules are connected by the wire harness, but because the number of modules is about 20–400, there is a problem to require longer time for connection according to the increase in number.

Furthermore, because the connection between the modules is made simply by inserting a wire harness into the connector, there is a problem that the modules tend to come out from the connector by vibration or the like, to cause defective display during use, thereby leading to loss of reliability.

SUMMARY OF THE INVENTION

The present invention has been made to solve the problems as above, and its object is to provide a highly reliable dot matrix display which is free from the trouble of work of connecting the leads comprising the wire harness and the like between the dot matrix modules to be displayed in parallel arrangements, and which does not show disconnection even in case of occurrence of vibration.

The dot matrix display according to the present invention comprises a plurality of parallel arrangements of the dot matrix modules which have a luminous section (dot, pixel or picture element) provided in matrix form, a drive section for controlling the ON and OFF of the luminous section, and a signal transmission section for transmitting and receiving the display signal for controlling the ON and OFF to the drive section, the signal transmission section comprises a light emitting element and a light receiving element, and the light emitting element and the light receiving element are provided on the respective module in opposed manner between the adjacent modules.

The drive section herein means the portion constituted by a control section for controlling the display contents as data and a drive circuit for driving LED. Also, the display signal means the signal for writing in the control section and displaying such as serial data of the display contents, clock signal, address signal, signal for defining address, signal for writing in memory, etc.

By adopting this constitution, it becomes unnecessary to connect wires between the modules, and the display signal can be transmitted by light. Because of this, there can be obtained a dot matrix display which is easily assembled, and is free from generating defective display even under vibration or the like.

Due to the provision of a plurality of the light emitting elements and light receiving elements in parallel arrangements on each module with separation of the areas between the adjacent light emitting elements or light receiving elements by the light shielding walls, respectively, no signal mixing occurs between the adjacent light receiving elements or no erroneous operation occurs by entry of external light, and desirable state is obtained.

It is possible for the signal transmission section to send and receive the display signal according to the putting on or putting off of the light emitting element proportionate to the high and low condition.

Due to the formation of the luminous section by the semiconductor light emitting element, e.g. lamp type light emitting diode or chip type light emitting diode, a dot matrix display by light emitting element is obtainable, and by formation of each dot by the pixel of the liquid crystal display module, a dot matrix display by liquid crystal display element. The chip type light emitting diode includes the light emitting diodes formed by showing flat type illumination through direct mounting of the LED chip on the display substrate or by mounting of the LED chip on the insulated substrate.

DETAILED EXPLANATION

Figure 1:
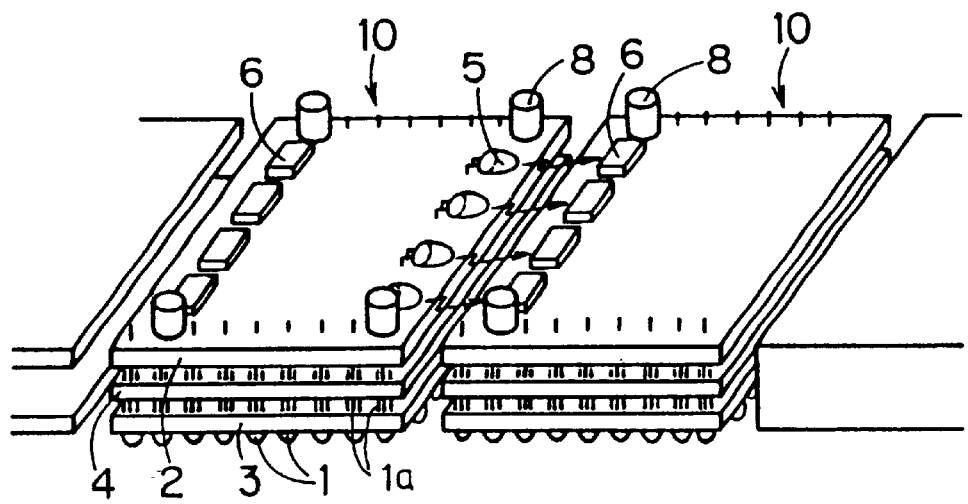
FIG. 1 is an explanatory view of an embodiment of a dot matrix display according to the present invention.

The dot matrix display unit of the present invention has, as its partial perspective explanatory view is shown in FIG. 1, a plurality of the dot matrix modules 10 in which each luminous section 1 is provided in matrix form being arranged in parallel disposition. And, on each module 10, there is provided a drive section for controlling the display contents (not illustrated), with the display signal on each module 10 being transferred to the adjacent module 10 from the end of the module 10 in parallel arrangement through the signal transmission section, and the lighting of dots being controlled on each module, thereby providing one display with the whole module. In the present invention, the signal transmission section for sending/receiving (transferring) the display signal between the adjacent modules 10 comprises a light emitting element 5 and a light receiving element 6, and the light emitting element and the light receiving element 6 are provided on each module 10 in opposed relations to each other between the adjacent modules 10. In FIG. 1, the part 8 is a metal fitting.

Figure 2:
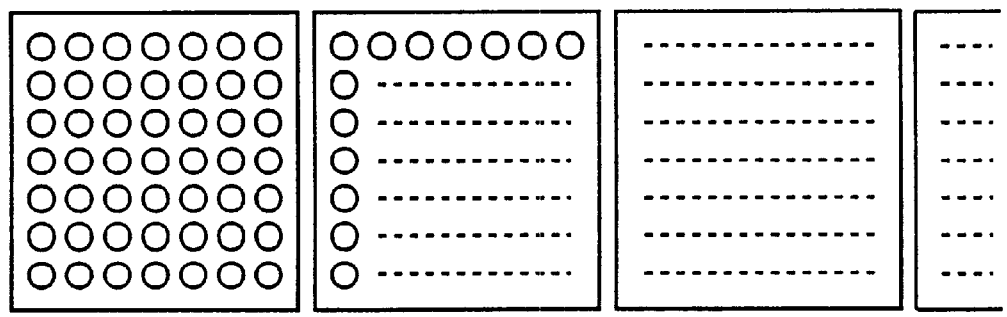
FIG. 2 is a plan explanatory view of the unit of FIG. 1 taken from the front side (display face)

The luminous section 1 comprises, for example, a red colored lamp type LED, and a dome style package section is fixed in a hole provided on the LED substrate 3. The LEDs are arrayed in a matrix form of, for example, 16×16 pieces. The lead 1a connected to the cathode and anode of each LED 1 (in the drawing, a lamp type LED is formed by sealing in by the two LED chips of different colors, and three leads extend therefrom) is connected to the non-illustrated wiring through a through-hole on the display section substrate 4 and fixed. Further, one of the leads of the LED 1 at the end is led through the control substrate 2, and is connected to the drive section comprising the non-illustrated IC and the like through the non-illustrated wiring. And, by the data signal sent from the drive section, control is made by the data signal sent from the drive section which dot LED is put on and which dot LED is put off, and the numerals, characters, graphics, etc. formed by the illuminated dots are to be displayed. A plan explanatory view taken from the front face of the dot matrix display formed by laterally arraying the modules in a row is shown in FIG. 2. For example, by displaying Japanese characters one by one by each of the module 10, a certain expression is displayed in a large scale by the whole modules.

This luminous section 1 may not be a lamp type LED but may be a bare chip (LED chip) or a chip type LED such as an LED for surface illumination by mounting an LED chip on a substrate. For example, a chip-on-board (COB) structure may be formed by such method as to mount an LED chip directly on the surface of the display section substrate 4, connect the anode and the cathode to the wiring pattern, and coat the surface side thereof with a case having a diffusion sheet on the surface side. In this case, the LED substrate 3 is unnecessary.

The control substrate 2 and the display substrate 4 comprise, for example, a liquid crystal polymer, BT resin, glass epoxy resin, etc., and on the reverse side or on both sides there are formed the non-illustrated wiring by patterning. The LED substrate 3 is formed of the similar materials, and is provided with through-holes in matrix form, so that the dome shaped package of a lamp type LED is fixed within the through-hole. In the case of the COB type, as described above, a case having a diffusion sheet on the front face on the surface side is capped.

Figure 3:
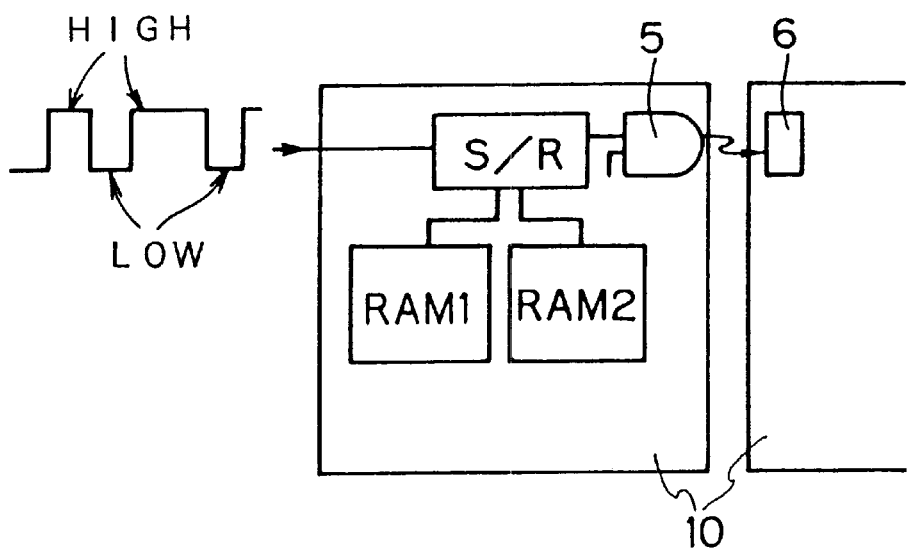
FIG. 3 is an explanatory view of a drive section provided on each module of the display of FIG. 1.

As there is shown a schematic view of the drive section of each module in FIG. 3, in order to make the desired display by controlling the luminous section 1, the display signals such as serial data, clock signal, address signal, address enable, light enable, etc. are transmitted from the ends of the arrayed dot matrix modules, and each module summarizes the data to be displayed by the module as the dot data and causes the memory RAM 1 to memorize by summarizing by the shift register (S/R) of the drive section based on one line. The data of the next module are sequentially transmitted to the succeeding module by the light emitting element 5 through the shift register (S/R) and the dot data of the module are memorized in the memory of the module in the similar manner. There are two each of the memory RAMs in each module. Now, in case the dots are in 16 rows, if the data of the 16 rows of the first expression are memorized in the first memory RAM 1 in order, then the dot data of the next expression are memorized from the first row in the second memory RAM 2 in the same manner, and the expression of the module is made by the data memorized in the first memory RAM 1.

These various display (expression) signals such as the dot data are, as shown in FIG. 3, transmitted by the "High" and "Low" CMOS level logic signals. In the present invention, the characteristic point is that the transmission means for the display signal are not only the wire-mediated electric signals but also the optical transmission by light medium such as infrared ray between the adjacent modules. Accordingly, between the adjacent modules, one module is provided with a light emitting element 5, and the other module is provided with a light receiving element 6 so as to be in opposed disposition to the light emitting element 5. In an example shown in FIG. 1, there are illustrated four light emitting elements 5 and light receiving elements 6 on a module 10, because of the simplification of the arrangements. But in order to send the respective signals mentioned above, about 10 signal leads become necessary. Then, about 10 sets of light emitting elements 5 and light receiving elements 6 are to be provided. The size of the module may be, for example, about 96 mm square, so array of about 10 light emitting elements 5 can be used without causing mixture if the directivity is set to be narrow. Further, as described later, by covering the light emitting elements 5 and light receiving elements. 6 with a light shielding wall, erroneous operation by external light can be prevented.

In case of transmitting the drive signal by the light emitting element 5 and the light receiving element 6 as described above, when the light emitting element 5 is turned ON at the time of "High" signal and the light emitting element 5 is turned OFF at the time of "Low" signal, the signals can be reverted to the electric signals as "High" signal at the time of receiving light with the light receiving element 6 and as "Low" signal at the time of not receiving light. By this step, a display signal comprising the similar kind of logic signal is received in the adjacent module, the necessary dot data are memorized in the memory RAM, and the signal for the adjacent module are similarly transmitted sequentially.

As the light emitting element 5, for example, an infrared ray light emitting element is preferable for preventing erroneous functioning by an external ray. If one which is easy to receive the light of the color of the light emitting element 5 is used as a light receiving element 6, the light emitting element of any other color may be used. As the type of the light emitting element 5, a lamp type one is preferable due to narrow the directivity, but by providing a light shielding wall as described above, a chip type light emitting element which shows lateral light emitting may be employed.

Figure 4:
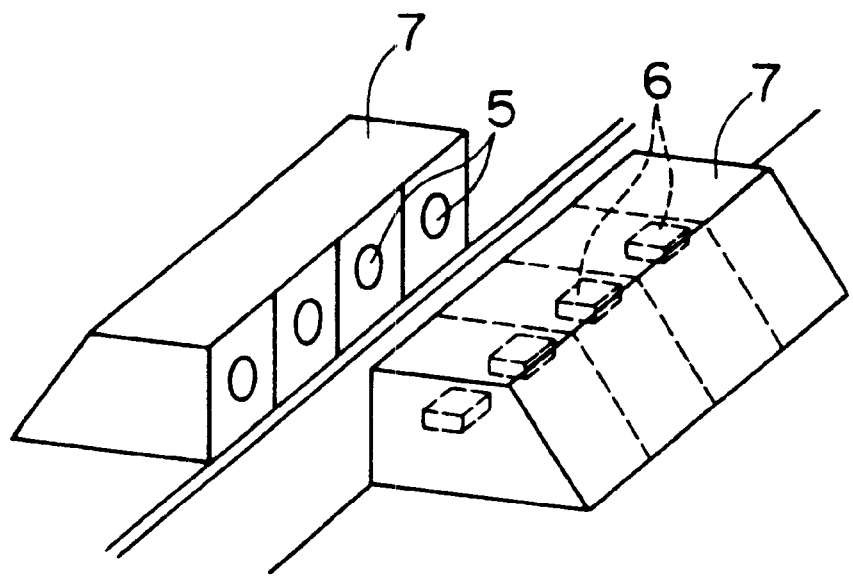
FIG. 4 is an explanatory view of an embodiment where light shielding walls are provided on the light emitting elements and light receiving elements of FIG. 1.
Figure 5:
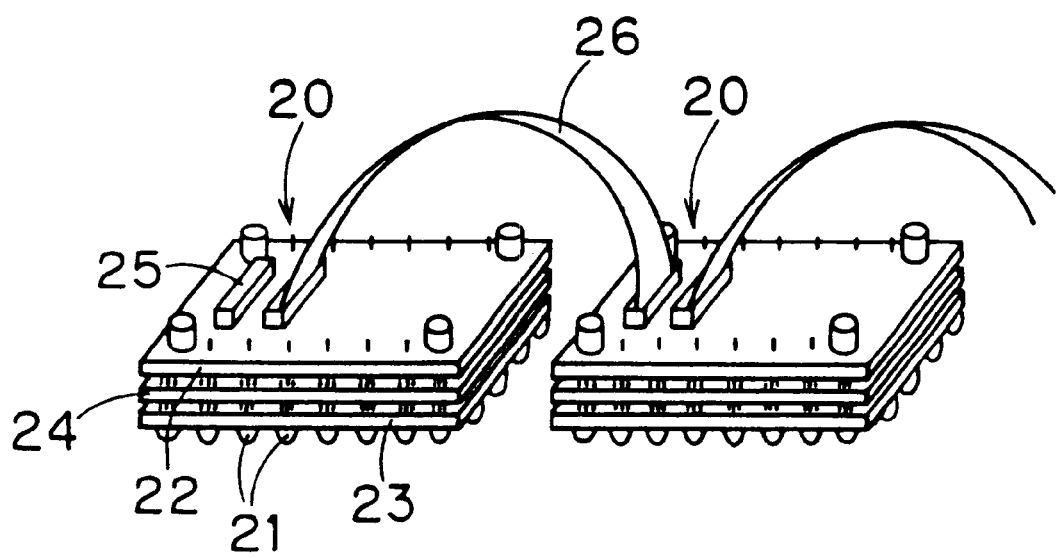
FIG. 5 is an explanatory view of conventional signal transmission means between modules.

As described above, in case of an apprehension to show mixture of signals by the light of the adjacent light emitting element 5 or an apprehension to cause erroneous operation by entry of the external light in the light receiving element 6, as shown in FIG. 4 in which a schematic view of a part of the light emitting element 5 and a part of the light receiving element 6 are illustrated, it is desirable to provide a cover 7 which shields the light of the light emitting element 5 and light receiving element 6 one by one. The cover 7 may be made of resin or metal or any other material whatsoever, provided that it does not transmit light illuminated by the light emitting element 5, and can have a structure to cover the surface on which the light emitting element 5 and the light receiving element 6 are mounted.

In the present invention, transmission of data between the adjacent modules is carried out by the light emitting element and the light receiving element. Since these display signals are all disposed by "High" signal and "Low" signal, those "High" and "Low" signals can be coordinated with the turning "ON" and "OFF" of light of the light emitting element. Consequently, the display signal can be expressed by "ON" and "OFF" of light, and the display signal can be transmitted without mechanically connecting the area between the modules which are arrayed in a row by the leads such as a wire harness.

In each of the examples given above, a lamp type or chip type semiconductor light emitting element is used as the illumination section. However, even in case of constituting the dot matrix module by a liquid crystal module using each pixel of the liquid crystal display element on which an electrode film is formed to form dot matrix as a dot illumination section, the data transfer between the modules can be realized by light by the combination between the light emitting element and the light receiving element in the similar manner.

According to the invention, because of the constitution of a large size dot matrix display by arraying many dot matrix modules for transmitting the data of each module sequentially from the module at the end and for transmitting the data by light by the combination between the light emitting element and the light receiving element, the display can be assembled simply by arraying and fixing the modules, only if the light emitting element and the light receiving element are provided in a predetermined positions respectively, without the necessity to connect the leads such as a wire harness to each module. Because of this, the assembly work is much simplified and cost reduction can be attained, and due to no defective display by disconnection of lead under vibration or the like during use, reliability is greatly improved.

Although preferred example have been described in some detail, it is to be understood that certain changes can be made by those skilled in the art without departing from the spirit and scope of the invention as defined by the appended claims.

What is claimed is:

1. A dot matrix display comprising:

a plurality of parallel arrangements of dot matrix modules which have a luminous section provided in matrix form, a drive section for controlling the respective "ON" and "OFF" of said luminous section, said drive section including a shift register, a signal transmission section for transmitting and receiving a display signal for controlling said "ON" and "OFF" to said drive section, and at least one memory device for storing display data corresponding to said display signal, said at least one memory device being provided on each of said dot matrix modules, wherein said signal transmission section comprises a light emitting element and a light receiving element, said light emitting element and said light receiving element being provided respectively on said modules in opposed manner between adjacent ones of said modules, wherein said plurality of parallel arrangements of dot matrix modules are in a series, and said at least one memory device includes a first RAM device and a second RAM device each connected to said shift register, said first RAM device storing display data from said shift register related to the current module of said series of modules from said shift register, and said second RAM device storing display from said shift register data related to the next module of said series of modules.

* * * * *